United States Patent
Hu et al.

(10) Patent No.: US 7,075,891 B2
(45) Date of Patent: Jul. 11, 2006

(54) METHOD AND APPARATUS FOR TRANSMITTING AND RECEIVING DATA PACKETS TO AVOID STALL DURING RE-SEQUENCING OF DATA PACKETS

(75) Inventors: Teck H. Hu, Budd Lake, NJ (US); Ashok N. Rudrapatna, Basking Ridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 812 days.

(21) Appl. No.: 09/994,490

(22) Filed: Nov. 26, 2001

(65) Prior Publication Data

US 2003/0099201 A1    May 29, 2003

(51) Int. Cl.
H04L 12/26 (2006.01)
H04L 1/18 (2006.01)
H04Q 7/24 (2006.01)
H04L 12/28 (2006.01)

(52) U.S. Cl. ............. 370/236; 370/428; 370/394; 370/338; 714/748

(58) Field of Classification Search ........... 370/428, 370/236; 714/748–750
See application file for complete search history.

(56) References Cited

U.S. PATENT DOCUMENTS

| 5,588,009 A | * | 12/1996 | Will ..................... 714/749 |
| 6,401,127 B1 | * | 6/2002 | Lei et al. ................ 709/235 |
| 2002/0131425 A1 | * | 9/2002 | Shalom .................. 370/401 |

FOREIGN PATENT DOCUMENTS

| EP | 1130839 | 9/2001 |
| WO | WO 00/57594 | 9/2000 |
| WO | WO 00/60799 | 10/2000 |

\* cited by examiner

*Primary Examiner*—Steven Nguyen

(57) ABSTRACT

In the method and apparatus for transmitting data packets, a source device places identifiers in data packets being transmitted. The identifiers identify data packets that the source device considers properly received by a destination device or identify data packets that have had their transmission aborted by the source device. When the destination device receives data packets including these identifiers and the identifiers identify data packets that the destination device has yet to receive, the destination device will proceed as if the identified data packets have been re-sequenced.

14 Claims, 1 Drawing Sheet

US 7,075,891 B2

METHOD AND APPARATUS FOR TRANSMITTING AND RECEIVING DATA PACKETS TO AVOID STALL DURING RE-SEQUENCING OF DATA PACKETS

BACKGROUND OF THE INVENTION

1. Field of the Invention

The present invention relates to next generation wireless communication; and more particularly, to eliminating stall during the re-sequencing of received data packets.

2. Description of Related Art

In telecommunications systems, particularly next generation wireless packet data systems, a base station transmits data packets to user equipments. However, the user equipment does not necessarily receive the data packets in the same order as they were transmitted. This out-of-sequence problem is compounded in systems such as High Speed Downlink Packet Access (HSDPA) in which an in-band priority class indicator (PCI) has been proposed to differentiate between the priority of logical channels' multiplexed in the same transport channel. Namely, even though data packets of a given priority class are transmitted in order, data packets of the given priority class will be received out of order on the receive side. In addition, data packets of other priority classes will be received interspersed with the receipt of data packets for the given priority class.

It has also been proposed with HSDPA that an in-band transmission sequence number (TSN) be provided with data packets for the re-sequencing functionality on the received side. And, U.S. patent application Ser. No. unknown entitled "A MULTI-PRIORITY RE-SEQUENCING METHOD AND APPARATUS", which is hereby incorporated by reference in its entirety, by the inventors of the subject application, discloses several methods of re-sequencing received data packets.

It is also the case that data packets are not received in certain types of systems. For example, when the receiver at a destination device (e.g., the user equipment) fails to decode a data packet, and sends the source device (e.g., the base station) of the data packet a non-acknowledge response indicating failure to properly receive the data packet, the source device is expected to retransmit the data packet. However, a transmission error (hereinafter "acknowledgement error") can occur with the non-acknowledge response such that the source device interprets the response as an acknowledge response—indicating receipt of the data packet by the destination device. As a result, the source device does not retransmit the data packet, and a gap will exist in the sequence of data packets at the destination device. A gap in the sequence of data packets at the destination device is also created if a data packet of a lower priority class has its transmission aborted in favor of a data packet of a higher priority class.

U.S. patent application Ser. No. unknown entitled "A MULTI-PRIORITY RE-SEQUENCING METHOD AND APPARATUS" by the inventors of the subject application discloses using a timer or counter to flush gaps in the sequence of data packets. The delay in outputting data packets due to a missing packet is called a stall. The stall period is determined by the length of the timer, and is typically set for a worst-case transmission scenario. For example, it may take several re-transmission attempts for proper receipt of a data packet. The length of the count down timer can be set to permit a maximum number of these retransmission attempts. However, the acknowledgement error and data packet abortion scenarios described above occur very quickly—in much less time than the length of the count down timer. Consequently, a lengthy stall occurs.

SUMMARY OF THE INVENTION

The present invention provides a method and apparatus for avoiding stalls in the re-sequencing of data packets.

When the source device receives an acknowledgement that the destination device has received a data packet, the source device inserts an acknowledge sequence number in a data packet for transmission. The acknowledge sequence number is the same as the transmission sequence number of the acknowledged data packet. On the receive side, the destination device will treat a missing data packet having the same transmission sequence number as the acknowledge sequence number as having been output to the next, upper layer of processing; namely, confirmation that the missing data packet is lost. And, because the missing data packet is flushed, stall is avoided.

Furthermore, when the transmission of a data packet is aborted, the source device inserts an acknowledge sequence number in a data packet for transmission. The acknowledge sequence number is the same as the transmission sequence number of the aborted data packet. Consequently, on the receive side, the destination device will treat the missing, aborted data packet having the same transmission sequence number as the acknowledge sequence number as having been output to the next, upper layer of processing. Because the missing, aborted data packet is flushed, stall is avoided.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein.

DETAILED DESCRIPTION OF THE PREFERED EMBODIMENTS

Figure 1:
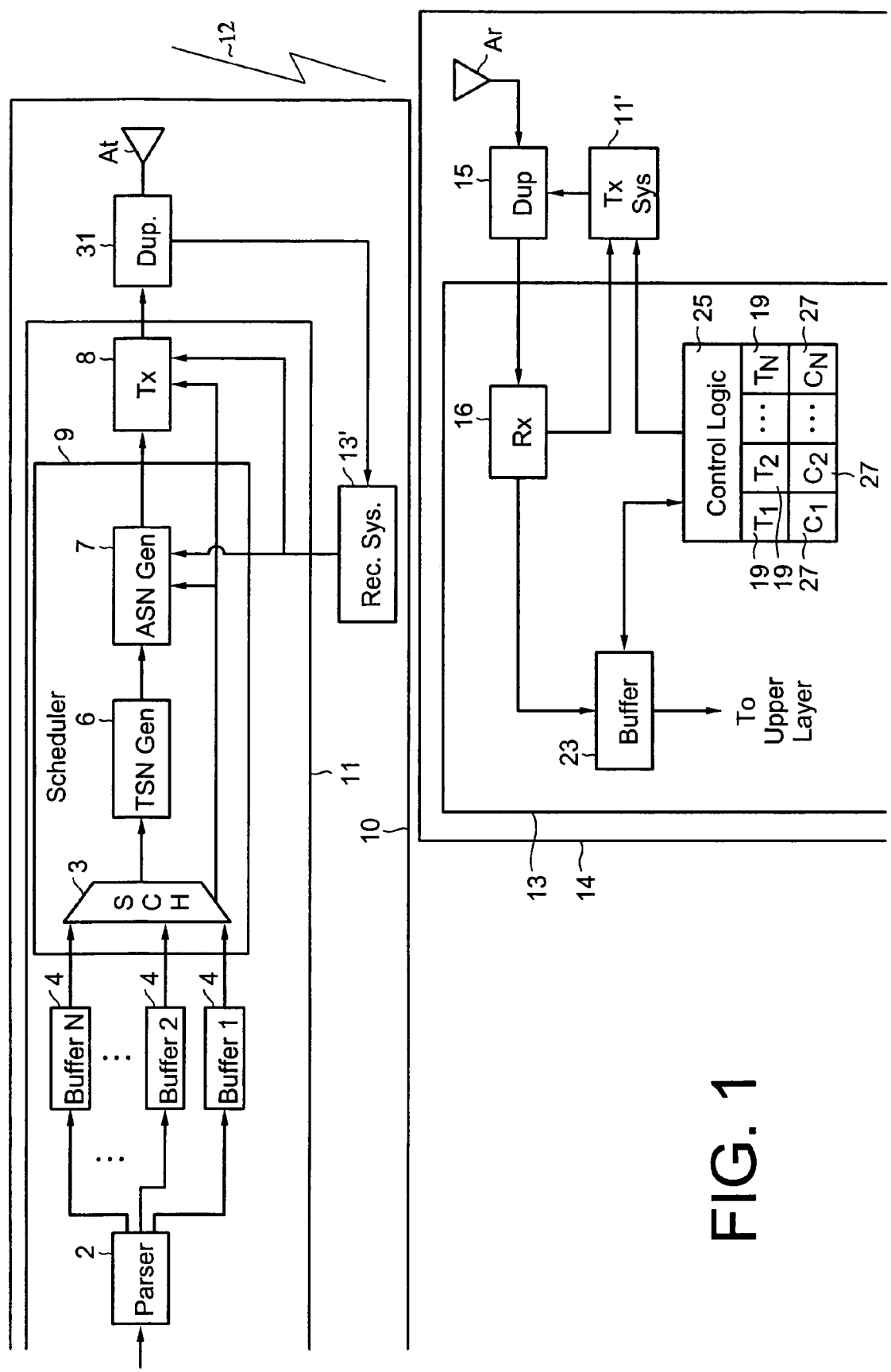
FIG. 1 illustrates a logical block diagram of a transmit and receive system employing stall avoidance methodologies according to an embodiment of the present invention.

FIG. 1 illustrates a logical block diagram of a transmit and receive system employing stall avoidance methodologies embodiment of the present invention. As shown, a source device (e.g., a base station) 10 transmits data packets over a medium 12 to a destination device (e.g., user equipment) 14. Hereinafter, the source device 10 will be referred to as base station 10 and the destination device 14 will be referred to as the user equipment 14, but it will be understood that the user equipment could be the source device and the base station the destination device.

The base station 10 includes a parser 2 that receives data packets for transmission from other base station circuitry, not shown for the sake of brevity and clarity. The data packets represent one or more logical channels, and have been assigned a priority class. Specifically, each data packet includes a priority class indicator (PCI) indicating the priority class (1 through N) of the data packet. In one embodiment, the PCI is disposed in a header portion of the data packet.

The parser 2 parses the data packets into one of N buffers 4 based on the PCI of the data packet. A buffer 4 is provided for, and associated with, a different one of the N priority classes; hence, N buffers 4 are provided. For example, the parser 2 outputs data packets having a PCI of 1 to the buffer 4 associated with priority class 1, outputs data packets having a PCI of 2 to the buffer 4 having a priority class of 2, etc.

A scheduler 9 receives the data packets from the buffers 4, and schedules the data packets for transmission by a transmitter 8. Specifically, a scheduling unit 3 receives the data packets, and orders the data packets for transmission based on their priority class. Data packets having a higher priority class will be scheduled for transmission prior to data packets of a lower class, and data packets having a higher priority class will pre-empt the transmission of data packets having a lower priority class. If a data packet having a higher priority class than the data packet currently undergoing transmission/re-transmission is received by the scheduling unit 3, the scheduling unit 3 instructs the transmitter 8 to abort transmission of the lower priority class data packet. The scheduling unit 3 also notifies an ASN generator 7 (discussed in detail below) of the aborted data packet.

A transmission sequence number (TSN) generator 6 receives the data packets for transmission from the scheduling unit 3 and assigns each data packet a transmission sequence number. The TSN generator 6 keeps track of a transmission sequence for each priority class; accordingly, there are N transmission sequences. The TSN generator 6 assigns the next TSN in the transmission sequence for the priority class to which a received data packet belongs. Specifically, the TSN is disposed in a predetermined position in the data packet. For example, in one embodiment, the TSN forms part of the header for the data packet.

After assigning a TSN to a data packet, the TSN generator 6 increments the TSN, and this new TSN will be assigned to the next, received data packet of that priority class. In a preferred embodiment, the TSN generator 6 begin by assigning a TSN of, for example, 0, and increments the TSN by 1.

Because a different transmission sequence is associated with each priority class, the data packets of a particular priority class have TSNs that are independent of the TSNs assigned to data packets of other priority classes. As a result, two data packets of different priority classes can have the same TSN.

An acknowledge sequence generator 7 generates an acknowledge sequence number (ASN) based on information from a receiving system 13', and inserts the generated ASN into a predetermined position in the data packet. For example, in one embodiment, the ASN forms part of the header for the data packet. The receiving system 13' has the same structure as the receiving system 13 in the user equipment 14, and will, therefore, not be described in detail as the receiving system 13 is described in detail below. Briefly, however, the receiving system 13' notifies the ASN generator 7 of the TSN and PCI for data packets that have been acknowledged by the user equipment 14 as properly received. The receiving system 13' also notifies the transmitter 8 of the TSN and PCI of data packets that have been properly and improperly received by the user equipment 14 along with and indication of whether receipt was proper or improper.

The ASN generator 7 generates an ASN equal to the TSN of the acknowledged data packet, and stores the generated ASN by the priority class of the acknowledged data packet. The ASN generator 7 also generates an ASN equal to the TSN of the data packet aborted by the scheduling unit 3. Specifically, the scheduling unit 3 identifies the data packet to be aborted by its TSN and PCI, the ASN generator 7 generates the ASN equal to the TSN of the aborted data packet, and stores the generated ASN with the other ASNs having the same priority class as the aborted data packet. The ASN generator 7 receives a data packet for transmission from the TSN generator 6, and identifies its priority class from its PCI. The ASN generator 7 then looks up the stored ASNs having that priority class, and inserts, for example, in one embodiment, the latest or most current stored ASN in the data packet. In this manner, the ASNs are inserted into the data packets on a last-in, first-out basis. In one embodiment, for example, the inserted ASN forms part of the header for the data packet.

A transmitter 8 receives the data packets from the scheduler 9, and multiplexes the data packets into a transport channel for transmission via a duplexer 11 and one or more antennas At over the medium 12. For data packets that the receiving system 13' identifies as not being properly received by the user equipment 14, the transmitter 8 retransmits those data packets. Additionally, the transmitter 8 expects to receive confirmation that a data packet has been received a predetermined period of time after transmission. If no such confirmation is received, then the transmitter 8 retransmits the data packet. And, after a data packet has been retransmitted a predetermined number of times, the transmitter 8 will not attempt further retransmissions.

At the user equipment 14, the data packets are received by a receiving system 13 via one or more receive antennas Ar and a duplexer 15. A receiver 16 decodes the data packets, and outputs the data packets to a single buffer 23, which stores the data packets. In a preferred embodiment, the buffer 23 is a random access memory. When the receiver 16 sends the data packets to the buffer 23, the receiver 16 instructs the transmission system 11' to output an acknowledge response for the received data packet. The acknowledge response identifies the received data packet by its PCI and TSN and indicates that the data packet has been received. However, if the receiver 16 is unable to receive the data packet (e.g., can not decode the data packet), the receiver 16 instructs the transmission system 11' to send a non-acknowledge response for the data packet. The non-acknowledge response identifies the received data packet by its PCI and TSN and indicates that the data packet has not been received. The transmission system 11' has the same structure as the transmission system 11 in the base station 10 described in detail above. For the purposes of explanation only, it has been assumed that the same technology is implemented for the reverse link (user equipment 14 to base station 10) and the forward link (base station 10 to user equipment 14).

Control logic 25 in the user equipment 14 causes the buffer 23 to output data packets to the next, upper layer of processing based on the PCI and TSN of the data packets. Specifically, the control logic 25 includes a counter 27 associated with each priority class. Accordingly, there are N counters 27. After the buffer 23 has been loaded with a predetermined number of data packets, the control logic 25 examines the TSNs of the data packets for priority class 1 and initializes the counter 27 associated with that priority class to a value equal to the lowest TSN of the data packets having a PCI of 1 in the buffer 23. This process is then repeated for each priority class.

Next, the control logic 25 instructs the buffer 23 to output a data packet having a PCI of 1 and the same TSN as the value of the counter 27 for priority class 1. After the buffer 23 outputs such a data packet, the counter 27 is incremented by the same amount that the TSN generator 6 increments the TSN. The comparison, output and increment process is then repeated for other data packets having a priority class of 1.

Furthermore, the same comparison, output and increment process is performed for data packets in the other priority classes using their associated counters 27. Additionally, when a counter 27 is initialized or after the counter 27 is incremented, the control logic 25 starts or resets a count down timer (e.g., 10 seconds) 19 associated with the counter 27. Alternatively, the count down timer 19 is started when a data packet having a TSN greater than the count value of the counter 27 is received. If the count down timer 19 expires before the buffer 23 receives a data packet having a TSN equal to the count value of the counter 27 for that priority class, the counter 27 is incremented. In this manner, even though data packets are received out of order by the user equipment 14, the data packets are sent to the next, upper layer of system processing in sequence.

The control logic 25 further monitors any ASNs in the received data packets. If the counter 27 for a priority class has the same count value as the ASN in a received data packet belonging to that priority class and a data packet in that priority class having a TSN equal to the ASN is not present in the buffer (e.g., is missing), the control logic 25 will treat the data packet having that priority class and a TSN equal to the ASN as having been output to the next, upper processing layer. Namely, the control logic 25 will increment the counter 27 associated with that priority class. This effectively flushes that data packet.

Accordingly, the present invention eliminates stall in the re-sequencing of received data packets. Because an ASN is generated for acknowledged and aborted data packets, stalls caused by acknowledgement error and data packet abortions are quickly eliminated. Also, the ASN is included in the data packet (i.e., signaled in-band), and does not impact system overhead.

As will be understood by those skilled in the art, FIG. 1 is a logical block diagram, and the elements illustrated therein are implemented by a programmed microprocessor and associated memory, hardware, firmware and/or a combination thereof. For example, the buffers 4 in one embodiment are registers, and in another embodiment are portions of a random access memory.

It will also be appreciated from the above disclosure that the present invention is applicable to any re-sequencing methodology, and is not limited to the re-sequencing methodology described.

The invention being thus described, it will be obvious that the same may be varied in many ways. Such variations are not to be regarded as a departure from the spirit and scope of the invention, and all such modifications are intended to be included within the scope of the following claims.

It is claimed:

1. A method of transmitting data packets, comprising:
assigning data packets a transmission sequence number, the transmission sequence number indicating a sequence of transmission for the data packets;
transmitting at least one of the data packets to a destination device;
aborting the transmission of at least one of the data packets; and
inserting an acknowledge sequence number in at least one of the transmitted data packets, the acknowledge sequence number being the transmission sequence number of one of the aborted data packets.

2. The method of claim 1, wherein the aborting step aborts the transmission of the data packet when another data packet having a higher priority class is ready for transmission.

3. A method of transmitting data packets, comprising:
assigning data packets a transmission sequence number, the transmission sequence number indicating a sequence of transmission for the data packets;
transmitting the data packets to a destination device;
aborting transmission of a data packet; and
inserting an acknowledge sequence number in at least one of the data packets, the acknowledge sequence number being the transmission sequence number of the data packet that was aborted.

4. The method of claim 3, wherein the aborting step aborts the transmission of the data packet when another data packet having a higher priority class is ready for transmission.

5. An apparatus for transmitting data packets, comprising:
a transmission sequence generator assigning transmission sequence numbers to first data packets, the transmission sequence number indicating a sequence of transmission for the first data packets;
a transmitter transmitting at least one of the first data packets to a destination device;
a scheduler instructing the transmitter to abort the transmission of at least one of the first data packets;
a receiver receiving second data packets from the destination device, at least one of the second data packets indicating by transmission sequence number whether one of the first data packets has been received by the destination device; and
an acknowledge sequence generator inserting an acknowledge sequence number in at least one of the first data packets based on second data packets received by the receiver, the acknowledge sequence number being the transmission sequence number of a first data packet that has been received by the destination device as determined by the receiver, the acknowledge sequence generator inserting an acknowledge sequence number equal to the transmission sequence number for the aborted first data packet into one of the first data packets to be transmitted.

6. The apparatus of claim 5, wherein the scheduler aborts the transmission of the first data packet when another first data packet having a higher priority class is ready for transmission.

7. An apparatus for transmitting data packets, comprising:
a transmission sequence generator assigning data packets a transmission sequence number, the transmission sequence number indicating a sequence of transmission for the data packets;
a transmitter transmitting the data packets to a destination device;
a scheduler instructing the transmitter to abort transmission of a data packet; and
an acknowledge sequence generator inserting an acknowledge sequence number in at least one of the data packets, the acknowledge sequence number being the transmission sequence number of the data packet that was aborted.

8. The apparatus of claim 7, wherein the scheduler aborts the transmission of the data packet when another data packet having a higher priority class is ready for transmission.

9. A method of receiving data packets, comprising:
receiving data packets at a destination device from a source device, each data packet having a transmission sequence number, the transmission sequence number indicating a sequence of transmission for the data packets, and at least one of the data packets including an acknowledge sequence number, the acknowledge sequence number indicating that the source device considers the data packet having a transmission sequence number equal to the acknowledge sequence number was received at the destination device;

storing the received data packets in at least one buffer;

outputting data packets in order of transmission from the buffer at least based on the transmission sequence numbers of the data packets and the acknowledge sequence number, so that a missing data packet having a transmission sequence number equal to the acknowledge sequence number is treated as having been output from the buffer.

10. The method of claim 9, wherein the outputting step further includes:

providing a counter;

comparing a counter value of the counter with the transmission sequence numbers of the data packets stored in the buffer;

outputting, based on the comparison, a data packet having the same transmission sequence number as the count value;

incrementing the count value when the outputting step outputs a data packet; and repeating the comparing, outputting and incrementing steps.

11. The method of claim 10, wherein the incrementing step increments the count value when the acknowledge sequence number equals the count value.

12. An apparatus receiving data packets, comprising:

a receiver receiving data packets at a destination device from a source device, each data packet having a transmission sequence number, the transmission sequence number indicating a sequence of transmission for the data packets, and at least one of the data packets including an acknowledge sequence number, the acknowledge sequence number indicating that the source device considers the data packet having a transmission sequence number equal to the acknowledge sequence number was received at the destination device;

at least one buffer storing the received data packets; and control logic instructing the buffer to output data packets in order of transmission at least based on the transmission sequence numbers of the data packets and the acknowledge sequence number, so that a missing data packet having a transmission sequence number equal to the acknowledge sequence number is treated as having been output from the buffer.

13. The apparatus of claim 12, wherein the control logic includes:

a counter; and wherein the control logic compares a counter value of the counter with the transmission sequence numbers of the data packets stored in the buffer; instructs, based on the comparison, the buffer to output a data packet having the same transmission sequence number as the count value; increments the count value when a data packet is output; and repeats the comparing, outputting and incrementing process.

14. The apparatus of claim 13, wherein the control logic increments the count value when the acknowledge sequence number equals the count value.

* * * * *